Feb. 25, 1964 A. KÄCH 3,122,663
MAGNETOHYDRODYNAMIC GENERATOR
Filed Nov. 8, 1960 5 Sheets-Sheet 1
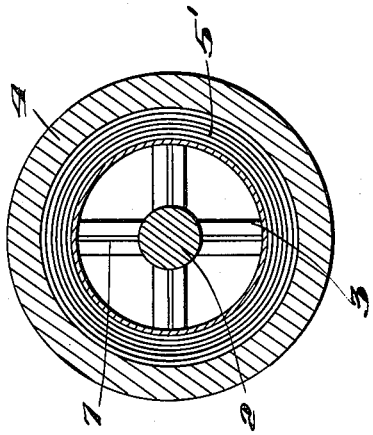
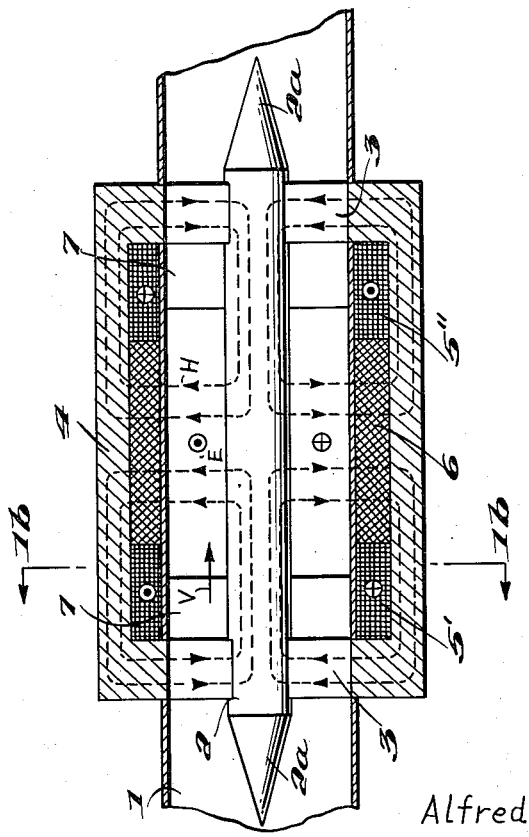
INVENTOR.
Alfred Käch
BY Pierce, Scheffler & Parker
ATTORNEYS

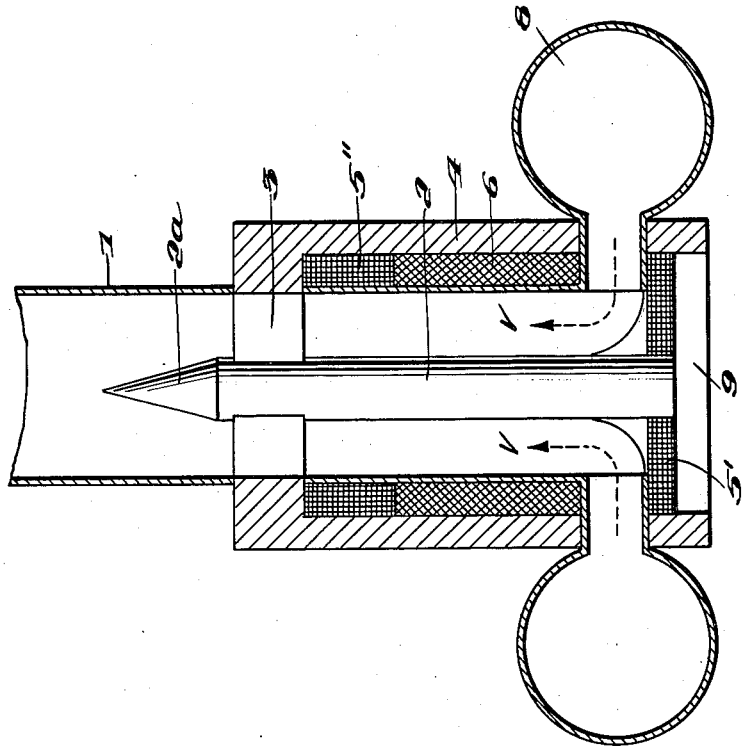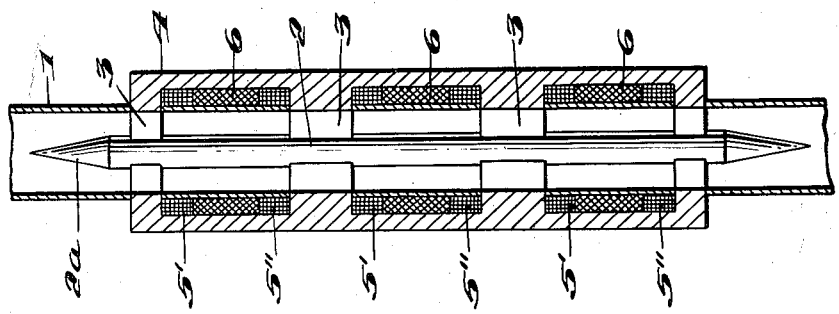

Feb. 25, 1964     A. KÄCH     3,122,663
MAGNETOHYDRODYNAMIC GENERATOR
Filed Nov. 8, 1960     5 Sheets-Sheet 4
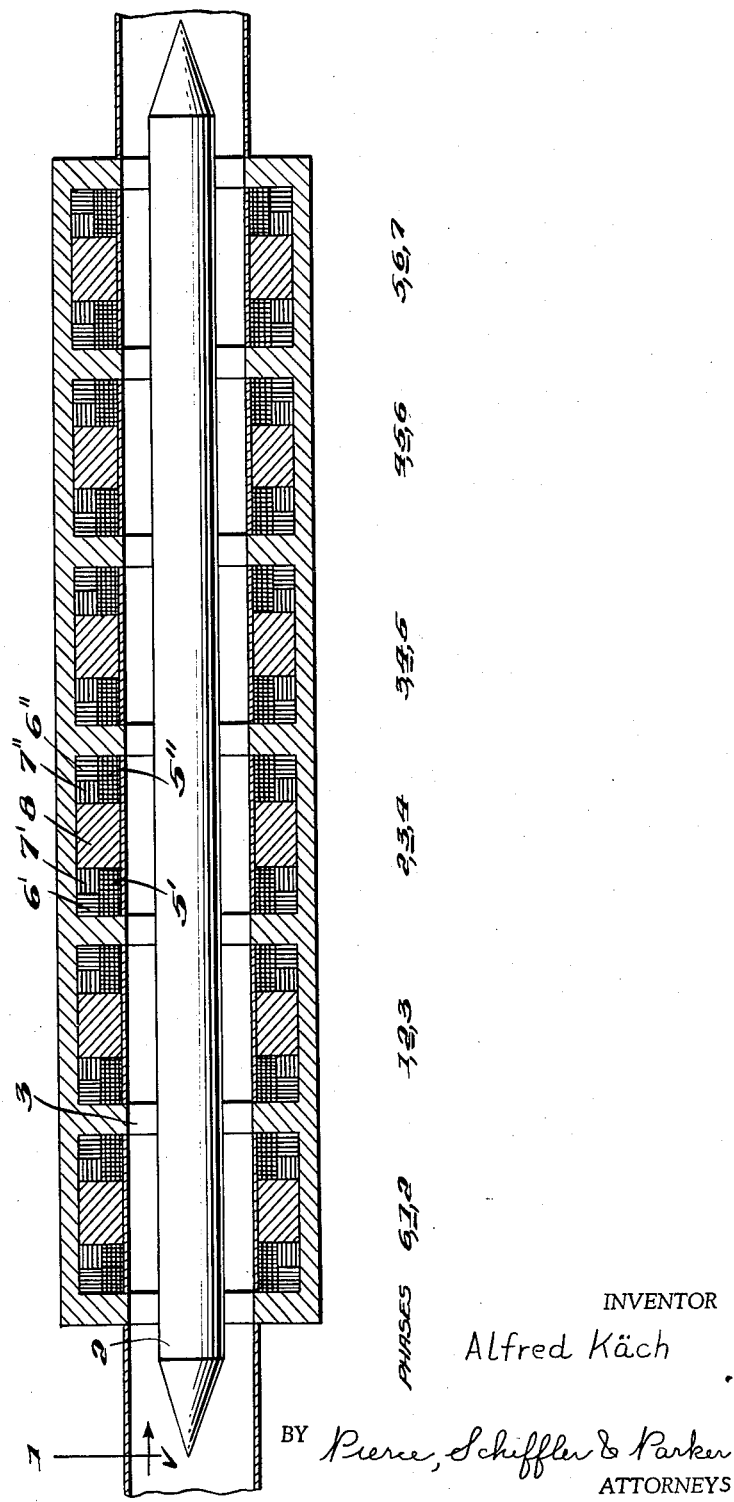
INVENTOR
Alfred Käch
BY Pierce, Schiffler & Parker
ATTORNEYS Feb. 25, 1964  A. KÄCH  3,122,663
MAGNETOHYDRODYNAMIC GENERATOR
Filed Nov. 8, 1960  5 Sheets-Sheet 5
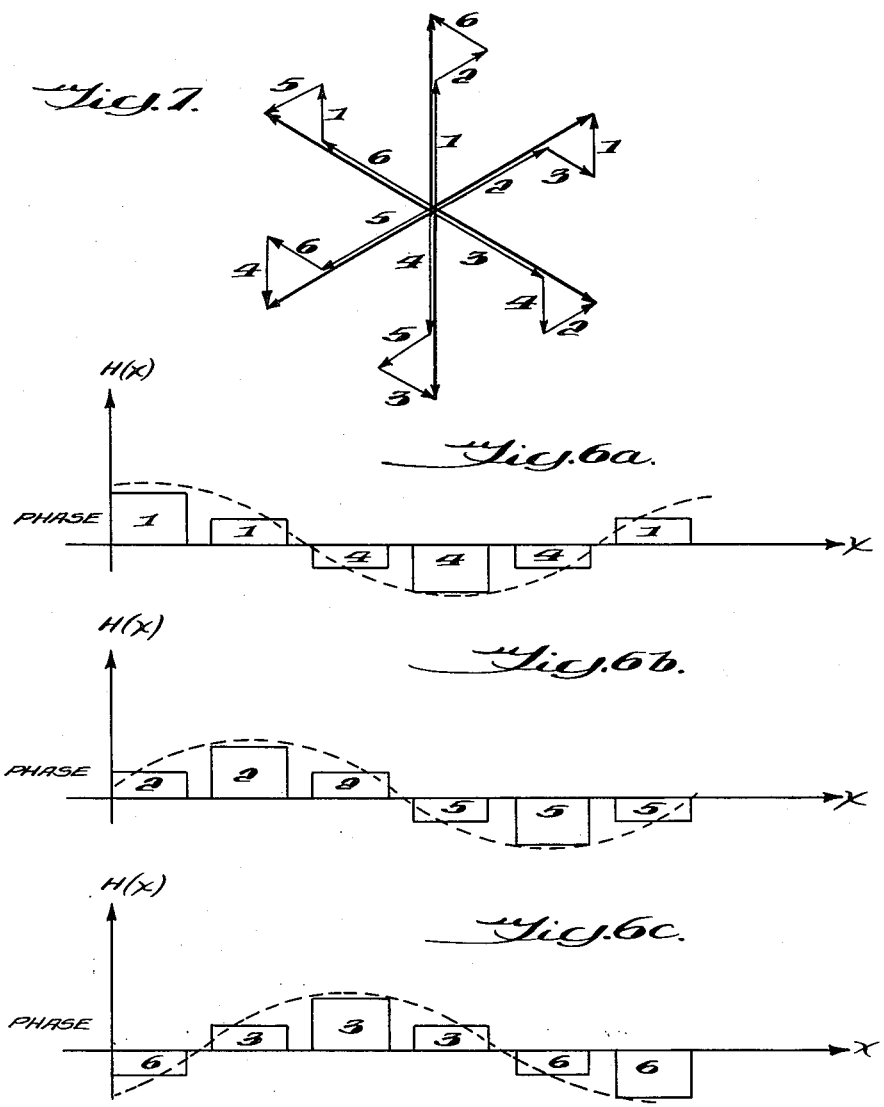
INVENTOR
Alfred Käch
BY Pierce, Scheffler & Parker
ATTORNEYS

United States Patent Office 3,122,663
Patented Feb. 25, 1964

3,122,663
MAGNETOHYDRODYNAMIC GENERATOR
Alfred Käch, Nussbaumen, near Baden, Switzerland, assignor to Aktiengesellschaft Brown, Boveri & Cie, Baden, Switzerland, a joint-stock company
Filed Nov. 8, 1960, Ser. No. 68,064
Claims priority, application Switzerland Nov. 14, 1959
5 Claims. (Cl. 310—11)

This invention relates to electrical generators and more particularly to generators of the "magnetohydrodynamic" type wherein an electrical output is generated by direct conversion from a heat output in the form of a high velocity heated ionized gaseous fluid.

Magnetohydrodynamic generators which have been proposed prior to the present invention include a channel through which is passed a hot ionized gas, means for generating a magnetic field extending transversely to the direction of flow of gas in the channel, and electrodes located within the channel for taking off the electrical power generated in the direct conversion process by separation of the electric charge carriers in the magnetic field. One such arrangement is disclosed in my co-pending United States application Serial No. 49,523 filed August 15, 1960.

The production of the electrodes involves particular difficulties. In view of the high gas temperature, usually a combustion chamber is provided as source of the gas stream, a possible electrode material is, for example, carbon. The burning down of the electrodes in operation requires electrode feeding devices, with all the complications which they involve. For generators of the size now considered to be particularly economical, currents in the order of magnitude of $10^5$ amperes must be tapped from the movable electrodes. But even if these problems were solved satisfactorily in the practice, there would still remain additional difficulties connected with the electrodes, of which only self-emission will be mentioned here.

The present invention relates to an improved construction for a magnetohydrodynamic generator which requires no electrodes. Therefore, the enumerated difficulties do not appear. This generator directly furnishes alternating current, so that the transformation necessary for direct current generators, which in view of the extremely great primary currents is likewise difficult to carry out, is eliminated entirely. The inventive idea provides applying a magnetic field which in the ionized gas stream brings about forcibly the formation of an electric field of a strength variable in time and having self-enclosed electric lines of force, and using the self-enclosed lines of force as the "primary winding" of a transformer whose secondary winding serves for the delivery of the generator power. Accordingly, the magnetohydrodynamic generator of the invention is characterized in that the channel presents substantially an annular cross-section and extends between the core and shell of at least one magnetic structure composed in the manner of a shell transformer, presenting oppositely fed windings for the generation of a magnetic field passing radially through the channel, and a secondary winding for the tapping of the generated alternating current power.

Various constructions and arrangements are possible within the inventive concept which will be described hereinafter in further detail, and these are illustrated in the accompanying drawings.

FIG. 1a of the drawings illustrates an embodiment of the inventive concept in longitudinal central section wherein the ionized gas is admitted to the magnetic structure in an axial direction through the channel from a combustion chamber source;

FIG. 1b is transverse sectional view taken on line 1b—1b of FIG. 1a;

FIG. 2 is also a longitudinal central section view of a modified construction wherein a plurality of combustion chambers are utilized to supply hot ionized gas for flow through the spaces between the central core in the channel and the magnetic shell surrounding the same, the combustion gas entering the space in a radial direction and then turning 90° to pass longitudinally through the space between the core and shell.

FIG. 3 is likewise a longitudinal central section view of still another embodiment of the invention wherein the combustion chamber for supplying the hot gaseous fluid has a toroidal configuration and is located at one end of the passageway between the core and shell, there being provided branch pipes leading from various take-off points around the periphery of the toroidal chamber to various parts of the passageway;

FIG. 4 is also a longitudinal central section view of yet another embodiment of the invention similar in construction to that of FIG. 1a but which is designed for the production of polyphase alternating current;

FIG. 5 is also a longitudinal central section view similar to that of FIG. 4 but applied to a six phase alternating current system;

FIGS. 6a to 6c are schematic representations showing the distribution of the individual magnetic systems provided by the six phases of the polyphase system according to FIG. 5, and FIG. 7 is a vector diagram illustrating the time sequence of the individual phases of the six phase system of FIG. 5.

Figure 3:
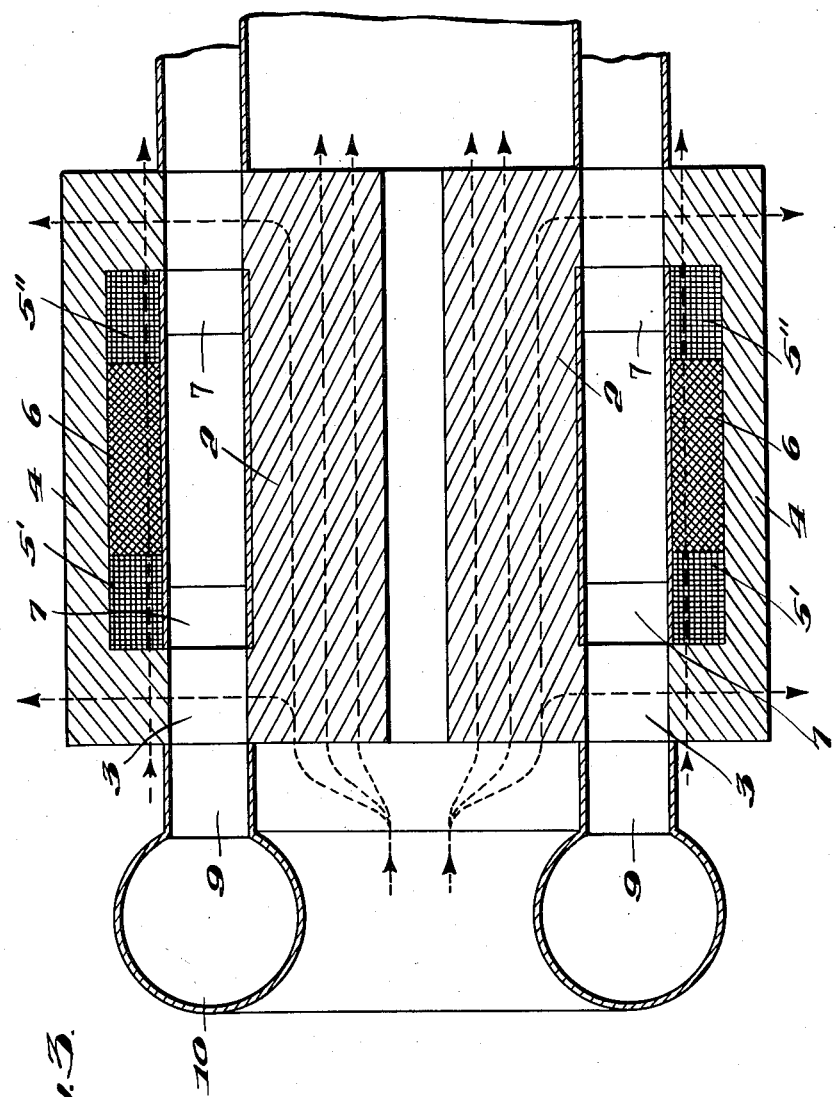

The construction and operation of a generator in accordance with the invention will now be further explained with reference to the embodiment shown in FIGS. 1a and 1b.

The magnetic structure includes a central core 2 of circular cross-section, a shell 4 of annular cross-section surrounding the core, and a plurality of radial "spokes" 3 serving as connections between the core and shell to carry the magnetic flux between the two. Channel 1, in which the gas flows in the direction V, extends in the active part of the generator between core 2 and shell 4; thus it presents at this point an annular cross-section. In order now to let an electric field E be generated whose self-enclosed electric lines of force surround the core 2, it is necessary to apply a magnetic field H passing radially through the channel. An adequately formed magnetic field, whose lines of force have approximately the course shown in broken lines in FIG. 1a, is generated by the two windings 5' and 5''. For this purpose these two windings must be traversed by the exciter current in opposite directions. If the magnetic field is excited with alternating current, then also the resulting electric field surrounding core 2 is an alternating field, whose line integral represents the primary voltage of the shell transformer. Therefore, an alternating current voltage can be tapped at the secondary winding 6. Because of the opposite direction of feed of the windings 5', 5'', these are decoupled in relation to the induction flux in the transformer and hence also in relation to the secondary winding 6. The induction flux lags behind the exciter flux by 90° in phase, so that relatively high core inductions are permissible for both fluxes. The walls of the channel must be provided with electrically insulating covering at least in the active part of the generator. Adequate cooling must be provided to make sure that nowhere in the magnetic structure the Curie point is reached. In view of the high velocity of the gas flow, the core 2 and spokes 3 in particular must be so designed that minimal flow resistances result. This measure is indicated in FIG. 1a as a tapering of both ends 2a of core 2. It is desirable to build up the core and shell parts of the magnetic structure from laminated iron. Thorough investigation of the operating conditions of such a generator has shown that it is advisable to provide small magnetic field strengths, a greater conductivity of the gas and shorter lengths of the active part than had been known to be the optimum for previously proposed direct current generators equipped with electrodes of comparable output.

From FIG. 1a, it is seen that within the magnetic structure in the vicinity of the spokes 3, there are more or less large spaces which are practically free from the magnetic field (broken lines) excited by the windings 5', 5''. Therefore, the induction flux of the transformer is able to induce currents in the conducting gas contained in these spaces which surround core 2. They can be suppressed by an arrangement of insulating plates 7 in radial planes directly behind the spokes 3 on the incoming side and also in front of the spokes on the outgoing side if desired.

Instead of the admission of the ionized gas in an axial direction shown in FIG. 1a, gas admission may be through the shell 4 itself. FIG. 2 shows such an arrangement, where each of the, say, four quadrantal sectors (cf. FIG. 1a) has its own combustion chamber 8 for the production of the gas stream, the gas entering radially through the shell 4 and then passing longitudinally. In this arrangement, the spoke star on the incoming side as provided by FIG. 1a may be replaced by an undivided plate 9. The same can also be done on the outgoing side if gas discharge is again radially through the shell 4.

Another possible embodiment is shown in FIG. 3. The admission of the gas into the annular channel is by way of a plurality of admission pipes 9 from various take-off points around the periphery of a toroidal combustion chamber 10. The broken lines in the figure indicate the advantageous conduction of a cooling medium. Instead of one toroidal combustion chamber, a combustion chamber for each admission pipe may, of course, be provided.

The generator for single phase alternating current, if properly dimensioned, can transform practically the entire thermal energy available for conversion into electrical energy. For this purpose the active part must be of a length such that the transit time of the gas stream in it is at least ¼ of the cycle of the alternating field. Also there may be provided several magnetic structures, which are traversed by the gas stream successively.

Multiphase alternating current (e.g. two- or three-phase) can be generated by assigning to the individual phases a magnetic structure for each, whose windings are fed from a corresponding multiphase source. The individual channels may be fed in parallel from a common combustion chamber, or each may have its own combustion chamber. It is also possible to arrange the channels along a single path in series, so that they are traversed by the gas stream one after the other. Provision must then be made that each part of the generator takes up only that part of the available power corresponding to it according to the particular phase number. The effective length of the active parts can then be kept relatively short.

FIG. 4 shows an arrangement for the generation of polyphase alternating current. It contains three magnetic structures joined together, of the kind described in FIG. 1a, with their windings, which are traversed by the gas successively. The three exciter winding pairs 5', 5'' are fed from a polyphase alternating current source; accordingly, polyphase alternating current power can be tapped at the secondary windings 6 connected together, for example, in star arrangement.

Besides the feeding of windings 5', 5'' of all embodiments with alternating current, other measures for the generation of an induction flux variable in time enter into consideration. For example, the windings 5', 5'' may be fed with direct current if provision is made that the electric conductivity and/or the velocity of the gas varies periodically. Control of the conductivity is possible by bringing about the known introduction of extraneous charge carriers (e.g. potassium ions) into the gas jet with periodic oscillation of the dosage. The velocity can be varied between a maximum and a minimum, the direction of flow remaining the same, or, with periodical reversal of the direction of flow, it may be varied between two maxima. In the latter case, the inflow of gas must take place alternately from both sides of the generator.

In a polyphase alternating current generator according to FIG. 4, the longitudinal pressure waves in the gas are smaller than in a single phase generator. However, the traveling magnetic field exhibits a high content of harmonics. The invention solves the problem of constructing such a generator in such a way that it furnishes a largely sinusoidal magnetic traveling wave. It is characterized in that the number of magnetic structures is at least equal to the number of phases of the current source generating the magnetic field, which is at least six-phase, and that the magentic field of each structure is generated partly by the respective main phase and partly by at least one other phase.

FIG. 5 shows an example of a construction, for an arrangement according to the invention, of the magnetic structures for a six-phase system, six magnetic structures being provided. In FIG. 5, 1 denotes the channel traversed by the gas with the velocity $v$, the channel having substantially an annular cross-section and extending between the core 2 and shell 4 of the magnetic structure composed in the manner of a shell transformer. The magnetic structures further comprise a plurality of radial spokes 3 as flux connections between the core and shell. The magnetic field radially passing through the channel is generated by the winding pairs 5', 5'' or respectively 6', 6'' and 7', 7'' provided in each magnetic structure. In the secondary windings 8, an alternating current voltage can be tapped.

The spokes disposed between the individual structures bring about a mutual decoupling on the one hand between the individual magnet systems and, on the other hand, between the particular exciter circuit and the associated generator circuit or neutralizing circuit. The shell transformer present in each neutralizing circuit is of conventional model with small stray reactance and large useful reactance. Due to the closed iron path, the induction flux determining the voltage induced in the secondary coil is greater by approximately the factor of the relative permeability, i.e. about 1000 times greater than it would be without spokes.

According to the invention, the magnetic field of each structure is generated partly by the corresponding main phase and partly by the two adjacent phases by means of separate windings. In FIG. 5 are entered the phases to which the respective winding pairs are connected for example, the respective main phases being underlined. The winding pair fed by the main phase, for example phase 3, is denoted 5', 5'', while the winding pairs fed by the adjacent phases 2 and 3 are denoted 6', 6'' and 7', 7'', respectively. It is found that in the case of a six-phase system, the resulting magnetic traveling field exhibits the fewest harmonics when the winding pairs fed by the adjacent phases have half the number of turns of the winding pair fed with the main phase, that is, when the excitation of the magnetic field occurs half by the main phase and one fourth each by the two adjacent phases.

In the arrangement shown in FIG. 5, only odd harmonics can in principle occur. It can be shown that the third harmonic disappears exactly with the mentioned distribution of the excitation over main and adjacent phases. Further design variations consist in the choice of length of the individual structures relatively to the pole division and in the form of the respective field curve. Thus, also the fifth and seventh harmonics can be suppressed. The ninth harmonic also disappears because the third harmonic is absent, so that by these measures one obtains as the resultant an almost harmonic-free field curve.

FIGS. 6a to 6c, show, in an idealized form, the field coverage to be assigned to the individual magnet systems by the various phases in the sense that the resulting field curve has as much as possible a sinusoidal form.

Lastly, in FIG. 7, the sequence in time of the individual phases is illustrated with reference to the vector polygon. The angle difference between the main phases of adjacent structures is 60 deg. in each instance.

The six-phase system required for the excitation of the arrangement shown can be easily obtained, including the various components, from a three-phase system. In this case it is advantageous to connect in series the windings of the magnetic structures belonging to the same phase. The length of the arrangement described comprises two pole divisions. Naturally, more pole divisions may be added. Also, the number of phases within a pole division may be more than three.

The higher the number of phases per pole division, the more the phase difference in time between them is reduced. In the spokes which pairs of magnet systems have in common, the transformer induction fluxes can then largely cancel each other out (for three phases per pole division by one half each), while the exciter fluxes are additive. It is therefore possible to keep the spokes relatively short in axial direction if the exciter inductions are much smaller than the induction in the transformer cores.

Naturally, the exciter winding and/or the secondary winding may be disposed entirely or partly on the core in the center of the channel. With proper distribution of the exciter winding a more homogeneous radial field can thereby be obtained, which is important especially for great channel widths.

I claim:

1. A magnetohydrodynamic generator comprising a channel of substantially annular cross-section traversed by hot ionized gas, said channel extending between the core and the shell of at least one magnetic structure composed in the manner of a shell-type transformer with yokes formed by radial spokes, means for the generation of a magnetic field extending transversely to the direction of gas flow, including between the outer surface of the channel and said shell of each magnetic structure two groups of windings for the generation of a magnetic field radially passing through the channel, said windings being connected with a source of alternating current such that the current in a winding of one group in each magnetic structure flows in opposite direction to the current in the corresponding winding of the other group, and a secondary winding in each magnetic structure for taking off the generated alternating current power.

2. A magnetohydrodynamic generator comprising a channel of substantially annular cross-section traversed by hot ionized gas and extending between the core and the shell of three successively arranged magnetic structures composed in the manner of a shell-type transformer with yokes formed by radial spokes and including between the outer surface of the channel and said shell of each magnetic structure two windings for the generation of a magnetic field passing radially through the channel, said windings of each magnetic structure being connected with a phase of a source of three-phase alternating current such that the current in one winding of each magnetic structure flows in opposite direction to the current in the other winding of the same magnetic structure, and a secondary winding in each magnetic structure for taking off the generated three-phase alternating current power.

3. A magnetohydrodynamic generator comprising a channel of substantially annular cross-section traversed by hot ionized gas and extending between the core and the shell of several successively arranged magnetic structures composed in the manner of a shell-type transformer with yokes formed by radial spokes, the number of the magnetic structures being at least equal to the number of phases of at least a six-phase alternating current source for generating a magnetic field, and including between the outer surface of the channel and said shell of each magnetic structure two groups of three windings for the generation of a magnetic field radially passing through the channel, one of said windings of each group being connected with the respective main phase and the two other windings of the same group being connected with the two adjacent phases of said alternating current source, whereby said windings are connected with said alternating current source such that the current in a winding of one group of each magnetic structure flows in opposite direction to the current in the corresponding winding of the other group, and a secondary winding in each magnetic structure for taking off the generated alternating current power.

4. A magnetohydrodynamic generator according to claim 3 wherein said magnetic field is generated by a six-phase current source, and wherein in each magnetic structure one half of the magnetic field is generated by the respective main phase and one half is generated by the adjacent phases in equal parts, the number of turns of the windings connected with the respective main phase being twice the number of turns of the windings connected with the adjacent phases.

5. A magnetohydrodynamic generator according to claim 4 wherein the windings connected with the same phase are connected in series.

References Cited in the file of this patent

UNITED STATES PATENTS

| 1,443,091 | Peterson | Jan. 23, 1923 |
| 2,702,004 | Blake et al. | Feb. 15, 1955 |